United States Patent
Powers

[11] 3,864,102
[45] Feb. 4, 1975

[54] DEHYDRATION OF A PIPELINE WITH A PORTABLE DRY AIR GENERATING PLANT

[75] Inventor: Marvin D. Powers, Houston, Tex.

[73] Assignee: Pipeline Dehydrators, Inc., Houston, Tex.

[22] Filed: June 25, 1973

[21] Appl. No.: 373,220

[52] U.S. Cl.......................... 55/30, 55/162, 55/179, 55/356, 134/8
[51] Int. Cl............................................ B01d 53/04
[58] Field of Search .......... 55/29, 30, 32, 162, 316, 55/385, 182, 356, 179; 134/8

[56] References Cited
UNITED STATES PATENTS

| | | | |
|---|---|---|---|
| 2,753,950 | 7/1956 | Baker et al. | 55/162 |
| 2,944,627 | 7/1960 | Skarstrom | 55/162 X |
| 3,395,511 | 8/1968 | Akerman | 55/316 X |
| 3,464,186 | 9/1969 | Hankison et al. | 55/316 X |
| 3,565,689 | 2/1971 | Lowe et al. | 134/8 |
| 3,715,866 | 2/1973 | Chatlos et al. | 55/316 X |

Primary Examiner—John Adee
Attorney, Agent, or Firm—Michael P. Breston

[57] ABSTRACT

A process and apparatus for dehydrating a pipeline by using a pig propelled through the pipeline with compressed, water-absorbing, oil-free air generated by a portable dry air generating plant positioned near the pipeline.

2 Claims, 3 Drawing Figures

FIG. I.

DEHYDRATION OF A PIPELINE WITH A PORTABLE DRY AIR GENERATING PLANT

BACKGROUND OF THE INVENTION

Various pipeline pigs for removing liquids from pipelines are known. Pigs which are now widely used throughout the industry are described, for example, in applicant's U.S. Pat. Nos. 3,643,280 and 3,659,305. In use, a gas under pressure propels the pig through the pipeline and water or other liquid in the pipeline is absorbed by the gas or moved by the pig downstream. The only two gases that have been commercially available and are dry enough for pipeline drying are nitrogen and natural gas.

When new pipelines are tested they are frequently subjected to a hydrostatic test. After such test it is necessary that most of the tested pipelines be well dried before hydrocarbon fluids can be sent therethrough. When hydrocarbon fluids such as combustible gases, oils, gasoline, etc., are sent through an improperly dehydrated pipeline, they are likely to become rejected by the consumer for containing an excessive amount of moisture. As a result, pipeline operators spend considerable effort and money in making certain that substantially all of the water in the pipeline is removed prior to sending hydrocarbon products through the pipeline.

Several passes through the pipeline must be made with the pig in the expectation that each such pass will remove a portion of the still remaining moisture in the pipeline. But even after a great number of pig passes, there is still no assurance that substantially all of the water will be removed from the pipeline. Pockets and/or films of water frequently remain in certain sections of the pipeline and their existence manifests itself only after an analysis is made of a fluid that has passed through the pipeline.

It is a general object of this invention to dry a pipeline by pushing a pig with non-poluting dry air which has the ability to absorb moisture. This invention eliminates the need for expensive nitrogen and/or precious natural gas.

SUMMARY OF THE INVENTION

A process and apparatus for dehydrating a pipeline by compressing near the pipeline ambient air, cooling the hot compressed air to condense water and compressor oil therefrom, filtering remaining oil vapors out from the cooled air, removing sufficient water vapor from the oil-free air to produce water-absorbing air, propelling a pig through the pipeline with the water-absorbing, oil-free air, and removing the pig, air and absorbed water at the downstream end of the pipeline along with any water that the pig may be pushing.

BRIEF DESCRIPTION OF THE DRAWINGS

Referring to FIG. 1, ambient air is compressed by a compressor (not shown). The compressed air is hot and contains water from the atmosphere and oil from the compressor. It is introduced by way of conduit 2 into an inlet chamber 4a of a header 4. For reasons of simplicity, only one such conduit 2 is shown, however, as many as three or more compressors can be connected to the header. The air flows from chamber 4a through conduit 6 to the inlet 7 of a cooling means, such as a heat exchanger 8. Air leaves exchanger 8 through outlet 9 and by conduit 10, flows into a separator, generally designated as 12, wherein the velocity of the cooled compressed air is reduced which allows the condensed oil and water to separate from the air stream and collect in a sump within the separator. This water can be drained out through line 13 controlled by an automatic valve 14. The air stream leaving separator 12 by line 15 still contains oil vapor and water vapor.

Figure 1:
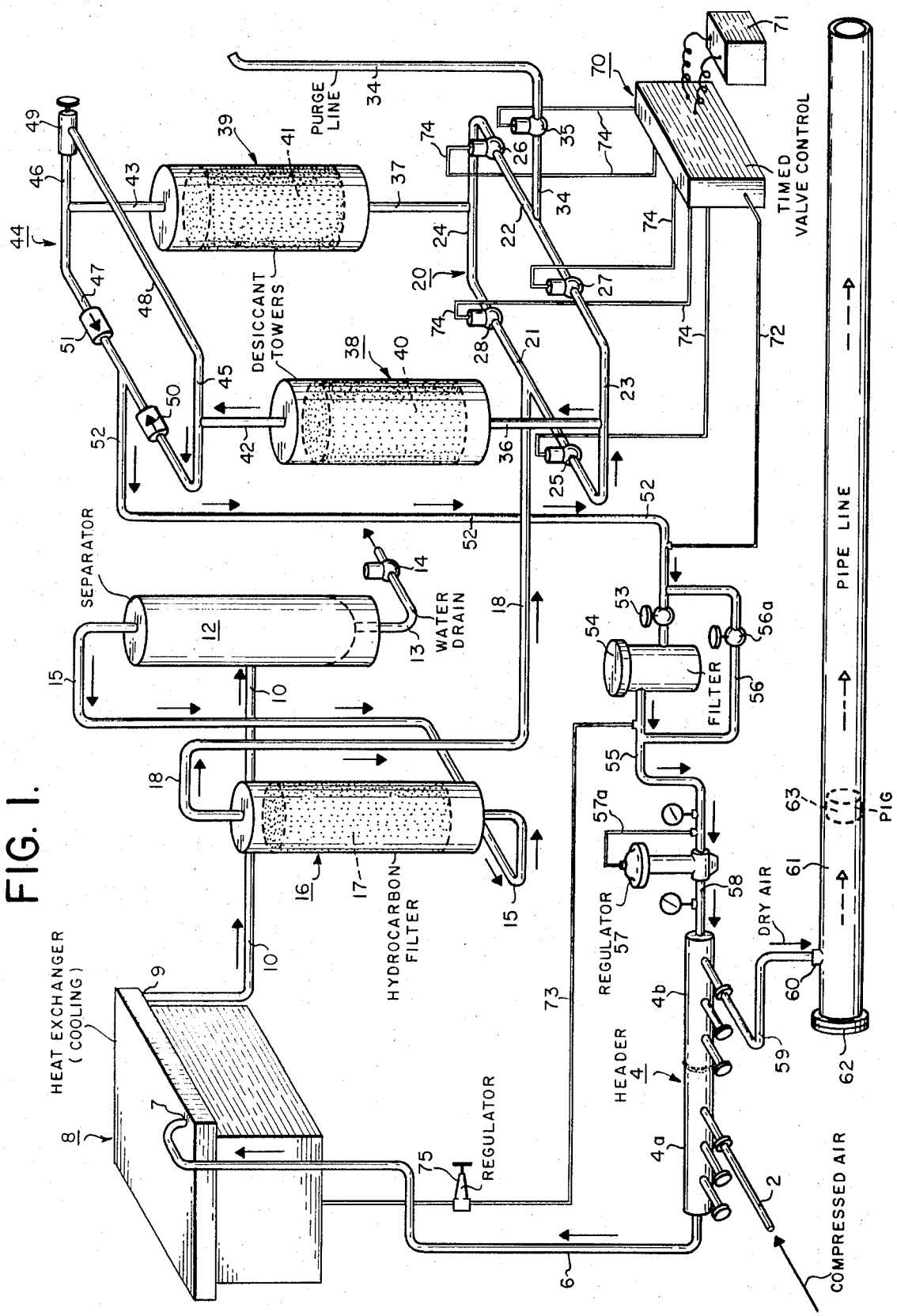
FIG. 1 is a schematic flow diagram showing the flow of air through the system.

In accordance with this invention the air stream is made to pass through an up-flow hydrocarbon filter 16 which removes the oil vapor from the air stream as it passes through a bed of activated carbon 17. Such oil filters are known in the art and remove oil vapor but not water vapor.

The oil-free air stream leaving the hydrocarbon filter 16 by line 18 enters a lower manifold, generally designated as 20. Manifold 20 has a substantially-rectangularly shaped loop consisting of two side conduits 21 and 22 interconnected by two end conduits 23 and 24. Flow through manifold 20 is controlled by spaced-apart diaphragm switching valves 25 and 28 inside conduit 21. Switching valves 25 and 28 are on either side of the junction between line 18 and side conduit 21, as shown.

A purge line 34 controlled by a diaphragm valve 35 connects into conduit 22 between another pair of valves 26 and 27. From end conduits 23 and 24 are provided conduits 36 and 37 which respectively connect into the bottoms of vertical-flow, water-vapor removing drums or towers 38 and 39. Towers 38 and 39 respectively contain filter beds 40 and 41, each including a suitable desiccant or drying agent.

The outlets of towers 38 and 39 respectively connect by conduits 42 and 43 into end conduits 45 and 46 of an upper, also substantially-rectangularly shaped manifold, generally designated as 44. End conduits 45 and 46 interconnect with side conduits 47 and 48. Flow between conduits 46 and 48 is controlled by a hand-operated glove valve or choke 49. Side conduit 47 contains two spaced-apart and opposing check valves 50 and 51. An outlet conduit 52 connects into conduit 47 between valves 50 and 51. Conduit 52 connects into a final filter drum 54 which serves to remove particles of crushed carbon or desiccant that may escape with the air stream as it passes through filter 16 or the beds in towers 38 and 39. The outlet of filter 54 connects by conduit 55 into a pressure regulator 57 which connects by line 58 into an outlet chamber 4b in the header 4.

One of the outlets of chamber 4b is connected by a flexible conduit or pipe 59 to a connector 60 extending from the interior of a pipeline 61 containing a pig 63 and an end closure 62. Closure means 62 may be a hinged door with releasable locking means so as to afford access to the pipeline for the consecutive insertion of the pigs 63.

Filter 54 may be bypassed by a conduit 56 connected between conduits 52 and 55 and controlled by valves 53 and 56a. Air supply line 57A is connected into conduit 55 to allow pressure regulator 57 to maintain a constant minimum processing pressure on the system. Air may be fed into the pipeline at any pressure or volume desired, up to the capacity of the compressors, but the minimum desired operating pressure is always maintained by regulator 57.

The entire dehydration or dry air generating plant is controlled by a control box, generally designated as 70, which is supplied with and operated by dry air by way of supply line 72 which is connected to the conduit 52. Control box 70 is time controlled by a clock (not shown) and is electrically powered by a storage battery 71 which may be a 12-volt, automobile type battery. By lines 74, instrument air pressure is supplied from control box 70 to the valves in the lower manifold 20.

Line 73 containing a pressure regulator 75 supplies operating air to a cooling fan motor (not shown) in the heat exchanger 8.

Figure 3:
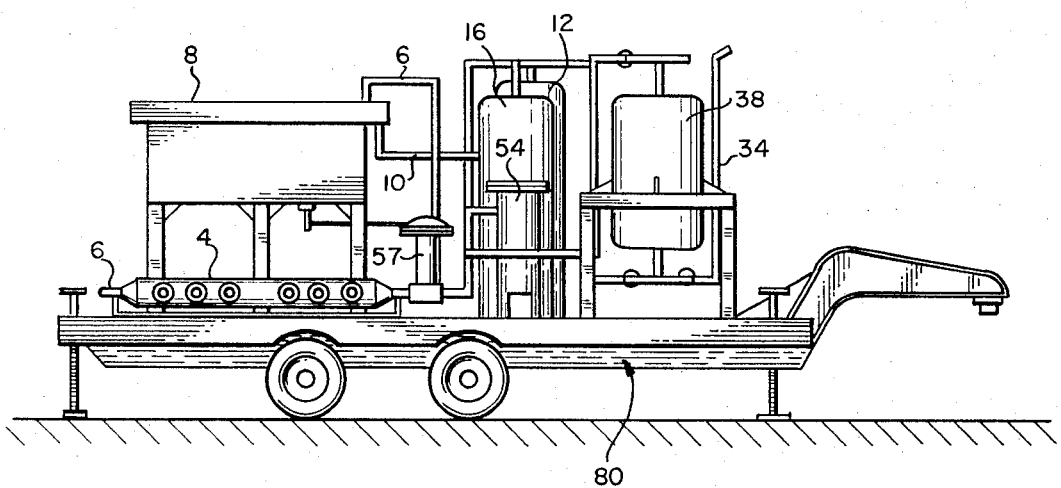
FIG. 3 shows the apparatus mounted on a portable trailer for carrying out the process of the invention.

The preferred dehydration plant for carrying out the process of this invention is shown mounted on a towable trailer or vehicle 80 (FIG. 3) wherein the same numerals are used to designate the same parts. Trailer 80 is positioned at the upstream end of the pipeline 61 near connector 60. One or more compressors (not shown) will be connected into the inlet chamber 4a by conduits such as 2, and the outlet chamber 4b will be connected to the pipeline 61 by one or more conduits 59, as previously described.

OPERATION

To dehydrate a pipeline, the gate or door 62 at the end of the pipeline is opened and a pig 63 having a circular cross-section is inserted into the pipeline and positioned downstream of the connector inlet 60. The door 62 is then closed. Compressed ambient air is supplied to the system through line 2 and the air in the plant starts flowing in the direction of the arrows, as shown in FIG. 1.

Referring now to the lower manifold 20, the valves 25, 26, 27 and 28 are operated in a criss-cross manner. At all times, valves 25 and 26 are either both opened or closed, and likewise are valves 27 and 28. The cycle may start with valves 25 and 26 open. Choke valve 49 is cracked open a predetermined amount and remains open during the entire operation of the system. Valve 49 acts as a metering valve.

The air stream from conduit 18 enters manifold 20 and flows through valve 25, conduit 23, conduit 36, bed 40 in tower 38, conduit 42, conduit 45, and check valve 50. The air stream flows out through conduit 52 and eventually flows into pipeline 61 behind pig 63. The pressure exerted by this air stream will push the pig and any water ahead of the pig through pipeline 61.

When the air stream reaches the pipeline, it is under pressure and is dry, that is, it has a great affinity for water. It is also oil-free. Hence the air stream can absorb an appreciable amount of water or moisture from the inner wall of the pipeline.

While dry air is supplied to the pipeline, dry air is also being supplied to the top end of tower 39 by way of conduit 45, conduit 48, choke valve 49, and conduits 46 and 43. The dry air stream by passing downward through tower 39 regenerates bed 41. Purge valve 35 is open and the wet air from the bottom end of tower 39 will vent to the atmosphere through conduits 37, 24, valve 26, conduits 22 and 34. After a predetermined time interval, such as five minutes, the purge valve 35 will close and pressure will build up in tower 39.

Figure 2:
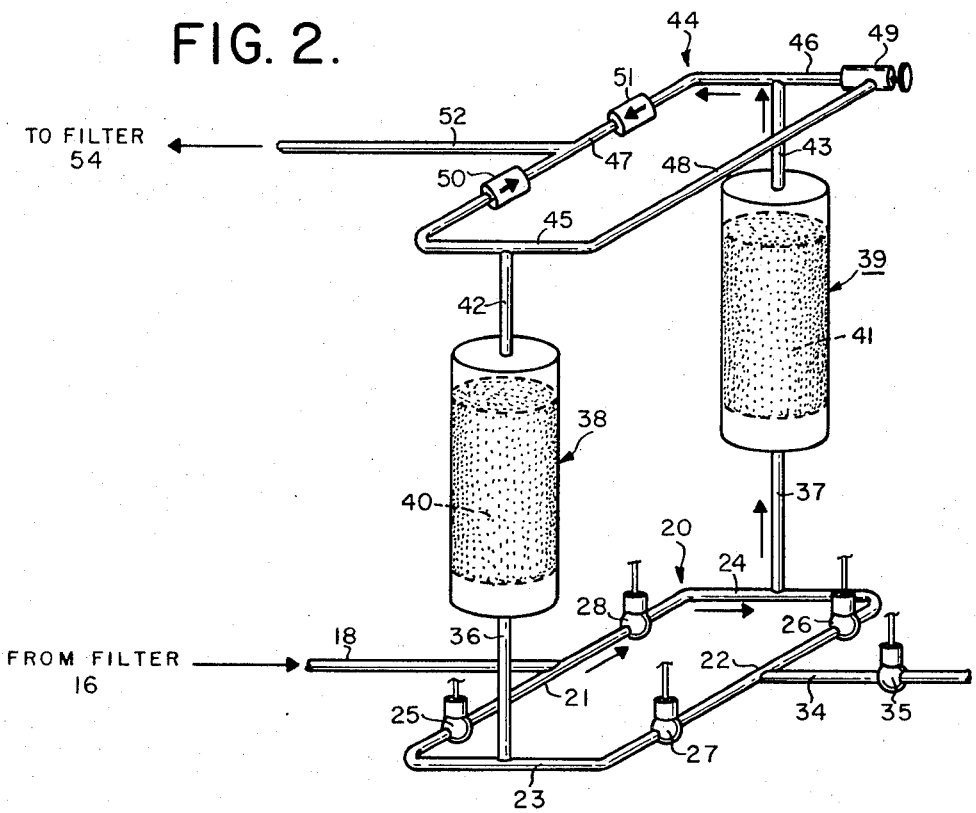
FIG. 2 illustrates how the flow is automatically diverted through the second of two drying towers.

Thereafter, it takes only a short time, say 2-½ minutes, for the tower 39 to reach operating pressure, say for example 300 psi, which may be the operating pressure of tower 38. The timer in control box 70 is set to switch the criss-cross valves approximately 2½ minutes after purge valve 35 closes. At that time valves 25 and 26 will close together, valves 27 and 28 will open together and purge valve 35 will also open. Dry air is now being supplied to the system from tower 39 as shown by the arrows in FIG. 2.

Tower 38 was previously at operating pressure so that when purge valve 35 opens, this pressure is released through the purge line 34 thereby starting the regeneration of the tower 38. The purge valve 35 will again stay open for a period of approximately 5 minutes so as to allow the dry air from tower 39 to flow through the bed of tower 38 and dry it out. At the end of the five minutes, the purge valve 35 again closes for approximately 2-½ minutes and pressure in tower 38 begins to build up. This completes a full 15 minute cycle for the system. However, the cycle can be shorter or longer as desired.

The dry air plant on the trailer 80 may be stationed in one location near the pipeline for several days and continuously provide water-absorbing, pig-propelling dry air to the pipeline. The pipeline itself may be one mile or five hundred miles long or longer. Several pigs may be moving through the pipeline at the same time and they may be spaced at desirable intervals. A preferred embodiment of applicant's system, with desired pressure and volume, will produce water-absorbing air to a dew point of −70°F or better.

A distinct advantage of the present invention lies in the fact that the dehydration plant is portable and requires no heat. The trailer may be approximately 8 feet wide and 20 ft. long. The plant needs no outside power source except a battery for actuating the switching mechanisms in the control box 70. All valves are operated by dry air. The heat exchanger itself is operated with processed air.

What is claimed is:

1. A process for dehydrating a pipeline adapted to carry fluids, said pipeline containing undesired water, said process comprising:
    moving to said pipeline a towable dehydration plant;
    compressing with said plant near the pipeline ambient air;
    cooling the compressed air to condense water and oil therefrom;
    filtering oil vapor out from the cooled air, and removing a sufficient amount of water vapor from the oil-free air to produce water-absorbing dry air;
    propelling a cylindrical pig through said pipeline with said dry air, thereby causing said pig to physically push the water downstream and said air to absorb water; and
    removing from the downstream end of the pipeline the water saturated air, the pig, and the water pushed by said pig.

2. A system for dehydrating a pipeline containing water, comprising:
    a towable, dry air generating plant for producing compressed, water-absorbing, substantially-oil-free, dry air;
    a cylindrical pig inside said pipeline;
    a line connecting the output of said plant to said pipeline upstream of said pig to feed dry air to said pipeline whereby said dry air propels said pig downstream without bypassing said pig, said pig pushing most of the water downstream and said dry air simultaneously absorbing a small portion of the water in said pipeline;

said plant including;

cooling means for cooling compressed ambient air, liquid-water-and-oil removing means coupled to the cooling means, oil-vapor filter means coupled to the liquid-removing means, at least two desiccant towers connected in parallel to the output of said filter means for removing water vapor from the cool, oil-free air, an upper manifold and a lower manifold, said towers being connected between said upper and lower manifolds, said lower manifold containing two pairs of switching valves operated in criss-cross fashion;

air-operated valve means for consecutively allowing one desiccant tower to generate dry air to its output line while the other desiccant tower regenerates;

a clock-controlled mechanism for controllably feeding instrument air to operate said switching valves at predetermined time intervals;

an electric battery for energizing said mechanism; and a trailer for carrying said plant to said pipeline.

* * * * *